(No Model.) 2 Sheets—Sheet 1.
E. MOTZ.
APPARATUS FOR EXTRACTING PRECIOUS METALS.
No. 582,077. Patented May 4, 1897.
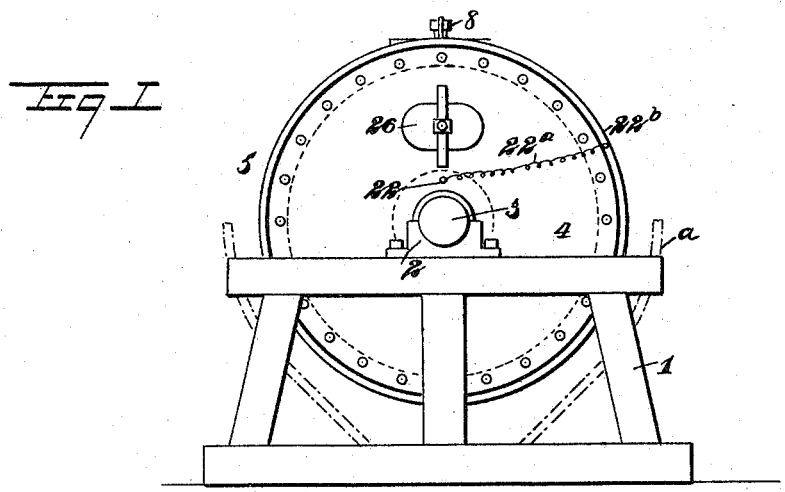
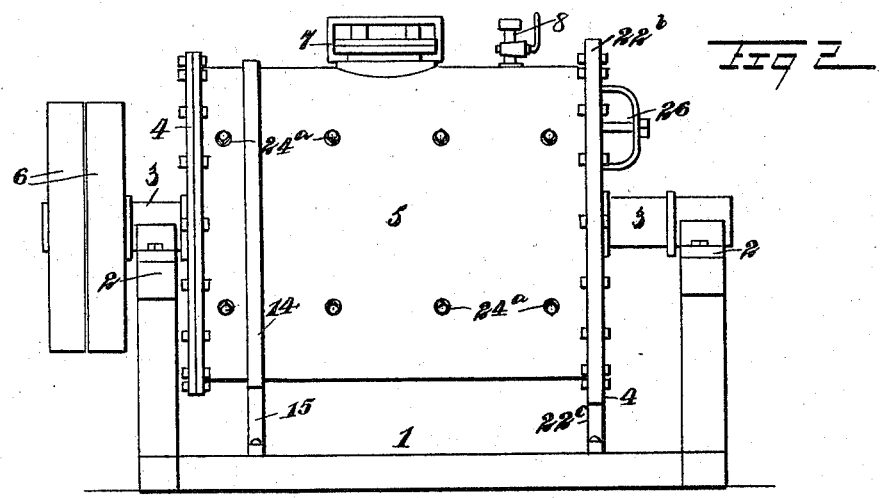
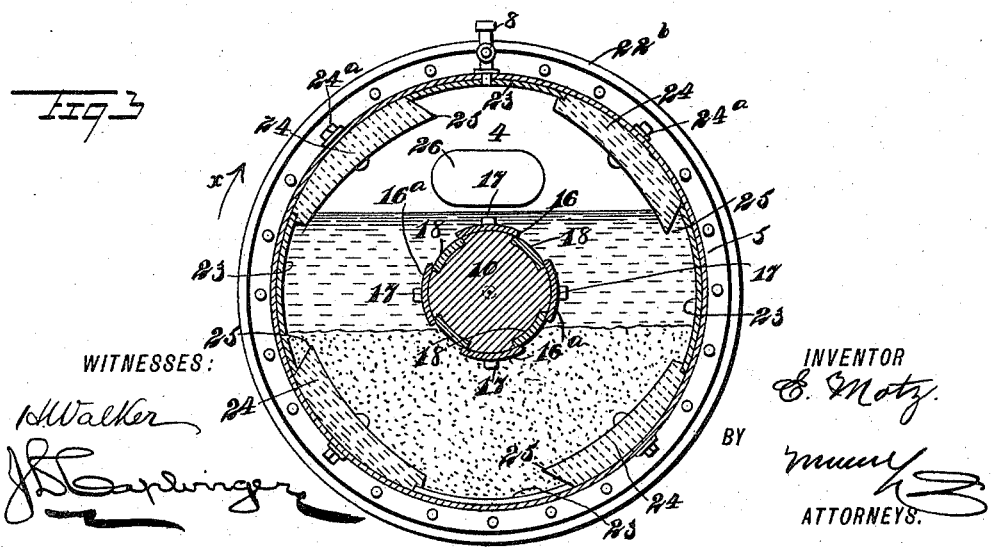
WITNESSES:
H. Walker
J. B. Caplinger
INVENTOR
E. Motz
BY
ATTORNEYS.
THE NORRIS PETERS CO., PHOTO-LITHO., WASHINGTON, D. C.

(No Model.) 2 Sheets—Sheet 2.
E. MOTZ.
APPARATUS FOR EXTRACTING PRECIOUS METALS.
No. 582,077. Patented May 4, 1897.
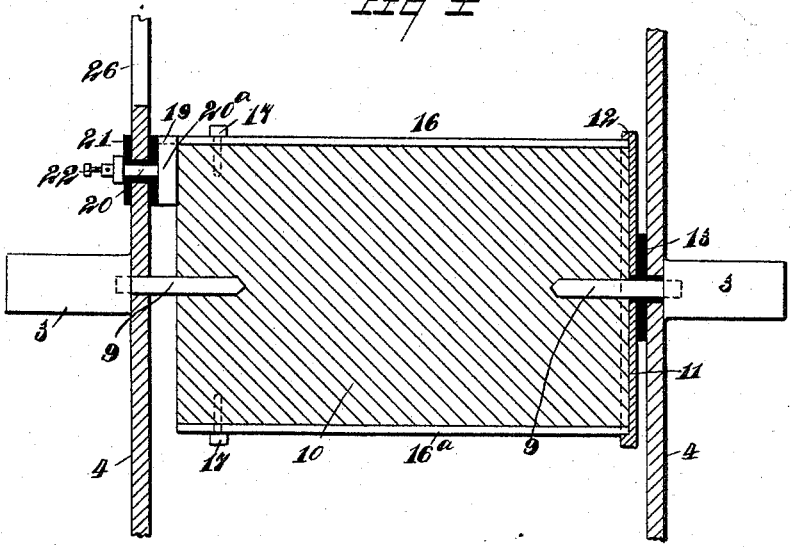
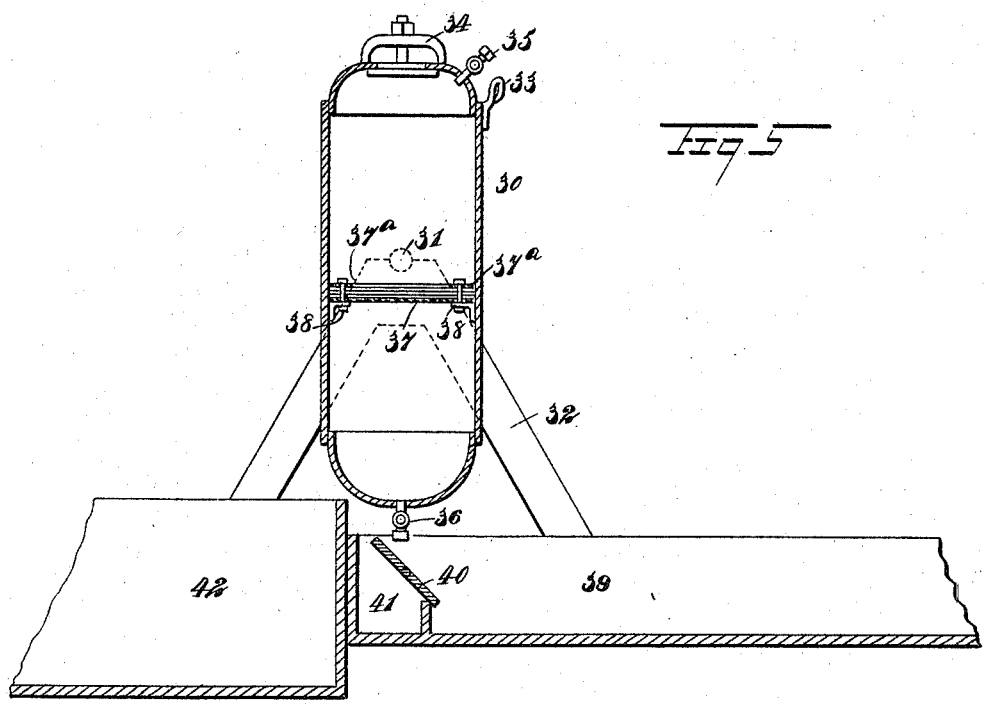
WITNESSES:
H. Walker
INVENTOR
E. Motz
BY
ATTORNEYS.

UNITED STATES PATENT OFFICE.

EMANUEL MOTZ, OF BREWERMINE, SOUTH CAROLINA.

APPARATUS FOR EXTRACTING PRECIOUS METALS.

SPECIFICATION forming part of Letters Patent No. 582,077, dated May 4, 1897.

Application filed March 27, 1896. Serial No. 585,081. (No model.)

*To all whom it may concern:*

Be it known that I, EMANUEL MOTZ, of Brewermine, in the county of Chesterfield and State of South Carolina, have invented a new and Improved Apparatus for Extracting Precious Metals, of which the following is a full, clear, and exact description.

This invention relates to improvements in the extraction of precious metals from their ores, and has for its object, in part, to provide a new and improved apparatus whereby the extraction of the metals is facilitated and simplified.

The invention consists in certain novel features of the construction, combination, and arrangement of the various parts of the apparatus, whereby certain important advantages are attained and the apparatus is made simpler, cheaper, and otherwise better adapted and more convenient for use than various other similar devices heretofore employed, all as will be hereinafter fully set forth.

The novel features of the invention will be carefully defined in the claims.

In carrying out my invention I place a suitable charge of ore within a drum or similar closed receptacle having means for causing the circulation of the charge within it, and in said drum or receptacle is also placed a suitable volume of aqueous solution of cyanid of potash or equivalent compound, together with a sufficient quantity of mercury to amalgamate the precious metal contained in the ore. Compressed air is then forced into the drum or receptacle to increase the pressure therein, so as to force the solution into the pores and crevices in the ore, and after a circulation of the ore and solution has been produced in the receptacle I pass an electric current through the ore, the terminals of the electric circuit being, by preference, formed of copper plates, whereon the precious metals are deposited. In this way the metals contained in the ore are subjected to the simultaneous action of atmospheric oxygen, cyanogen, mercury, and the electric current, so that the precious metals are deposited in the form of amalgam on one of the electrodes of the circuit, so as to be capable of being readily withdrawn after the conclusion of the process. After the conclusion of the operation the charge of solution and ore contained in the drum or receptacle is withdrawn therefrom and filtered, so as to separate the solution from the slime, after which the slime is passed through a sluiceway containing riffles, wherein the mercury and amalgam which may have escaped may be collected.

Reference is to be had to the accompanying drawings, forming a part of this specification, in which similar characters of reference indicate corresponding parts in all the views.

Figure 1 is an end view of the apparatus. Fig. 2 is a side view of the same. Fig. 3 is an enlarged sectional view taken through the drum of the apparatus. Fig. 4 is an enlarged view showing the wooden core on which the negative electrodes of the circuit are mounted, and Fig. 5 is a view showing the form of filter preferably employed in connection with the apparatus.

Referring first to Figs. 1 to 4, 1 indicates a suitable frame, having at its ends bearings or journal-boxes 2, wherein are mounted to turn trunnions 3, formed on the end plates 4 of a drum 5, said end plates being bolted to flanges formed on the ends of the drum, as clearly indicated in Fig. 2. One of the trunnions 3 is made to project beyond the frame, as shown at the left in Fig. 2, and is provided with tight and loose pulleys 6, whereby the drum 5 may be rotated from any suitable source of power by means of a belt or the like. At its central portion the drum 5 is provided with a manhole or charging-aperture 7, and near one end said drum is also provided with a valved connection 8, to which may be coupled a pipe for supplying said drum with compressed air.

To the trunnions 3 of the drum are secured inwardly-extending trunnions 9, alined with each other and arranged inside the drum 5, on which trunnions is mounted a core 10 of wood or other insulating material, provided at one end with a metal plate or head 11, insulated from the trunnion 9 and from the end plate 4 of the drum 5 by means of a block 13 of insulating material, and having its edges projecting slightly beyond the peripheral surface of the core 10 and provided with a projecting or overhanging flange 12, as clearly shown in Fig. 4.

16 and 16ª indicate copper plates extending lengthwise along the periphery of the core 10, each plate having one end held under the overhanging flange 12 of the head 11, as seen at the right in Fig. 4, and having its opposite end secured in place by means of a screw 17 or equivalent device. The plates 16 and 16$^a$ have their opposite side edges arranged to overhang the edges of channels or grooves formed longitudinally in the core 10, in which channels are arranged other copper plates 18, held in place by the plates 16 and 16$^a$, and adapted to be removed after said plates have been loosened from the core.

The plate 16 is made to extend slightly beyond the end of the core 10, as indicated in dotted lines at 19 in Fig. 4, and said extending portion of the plate 16 is adapted to engage in a slot or recess formed in the head 20$^a$ of a bolt 20, mounted in a sleeve 21, of insulating material, secured in one of the heads 4 of the drum 5, the end of the bolt being arranged outside the drum and provided with a binding-screw 22, connected by a wire 22$^a$ with an insulating ring or band 22$^b$, encircling the end of the drum, as clearly shown in Figs. 1 and 2, and said ring or band is adapted for contact with a brush 22$^c$, forming one terminal of an electric circuit. In this way it will be seen that the engagement of the projecting end 19 of the plate 16 with the head 20$^a$ of the bolt 20 serves to lock the core 10 against turning on its trunnions 9 within the drum 5, and at the same time connects the plates 16, 16$^a$, and 18 in the electric circuit, so that they form one terminal thereof, said plates being connected at the end of the core by means of the metal head 11.

The other terminal of the electric circuit is connected with a brush in rubbing contact with a band 14, encircling the drum 5, as seen in Fig. 2, and inside the periphery of the drum 5 are arranged a series of copper plates 23, extending longitudinally thereof and held in place by means of wooden strips 24, also extending longitudinally inside the drum and having their edges arranged to overlap the edges of said copper plates 23. The wooden plates or strips 24 are held in place by means of bolts 24$^a$, and each strip is formed at one edge with a beveled overhanging surface 25, adapted to scoop the ore as the drum rotates in the direction of the arrow $x$ in Fig. 3, so as to lift the same from the bottom of the drum to the upper portion thereof and permit said ore to fall through the compressed air at the upper part of the drum onto the copper plates 16 and 16$^a$, held on the core 10.

In one end or head 4 of the drum 5 is formed a hand-hole 26, as indicated in Figs. 1, 3, and 4, and said hand-hole is located adjacent to the bolt 20, which holds the core 10 against movement inside the drum. The hand-hole 26 is provided with a tight cover, and when said cover is removed access may be had to the interior of the drum, so that the screw 17, holding the plate 16 in place on the core, may be removed, whereby said plate 16 may be withdrawn, carrying with it the amalgam and releasing the core, so as to permit it to be turned in the drum 5. When released, the core is rotated on its trunnions 9, so as to permit the remaining plates 16$^a$ and 18 to be removed from the core.

In operation the charge of ore is placed in the drum 5, as indicated in Fig. 3, and the solution of cyanid of potash or equivalent substance, together with the mercury for forming the amalgam, is also placed in the drum, after which the drum is closed. Compressed air is then forced through the connection 8 into the drum, so as to raise the internal pressure to a sufficient degree, after which the drum is set in rotation and the electric current is passed between the positive plates 23 and the negative plates 16, 16$^a$, and 18. The mercury immediately amalgamates the copper plates 16, 16$^a$, and 18, so that the plates are thus protected from the action of the cyanid of potash upon the plates, and the amalgam thus produced serves to retain the particles of gold coming in contact with it. The ore contained in the lower part of the drum is raised by the surfaces 25 of the strips 24 to the upper portion of the drum in a wet condition, and is then allowed to fall from said surfaces through the compressed air contained at the upper part of the drum onto the negative plates held on the core 10. The electric current passing between the positive and negative plates held on the drum 5 and core 10, respectively, deposits the metal held in solution upon the negative plates of the core 10.

After the rotation of the drum has been continued for a sufficient time the drum is stopped and the cover of the manhole 7 is removed, after which the drum is turned around so as to discharge the contained ore and solution through the manhole 7. To prevent scattering of the ore and solution, I prefer to employ a hopper, (indicated in dotted lines at $a$ in Fig. 1,) surrounding the lower part of the drum and arranged to convey the ore and solution into a filter comprising a casing 30 (see Fig. 5) and made in the form of a cylinder having at its opposite sides trunnions, as shown at 31, mounted to turn in a suitable frame 32. The drum 30 is provided with a lug 33, adapted to receive a rope or the like, by which means the filter may be turned on its trunnions, as will be readily understood.

At its upper end the filter is provided with a manhole 34, having a suitable cover, and with a valved connection 35, adapted to receive a hose whereby compressed air or the like may be supplied to the filter to force the liquid through the filter-bed, and at its lower end the filter is provided with a valved outlet 36. The filter is provided with a bed 37, supported at its edges on a shelf 38, extending around the interior of the casing and comprising a lower wire screen, on top of which rests another screen of finer mesh, on which is supported a filter-cloth or cocoa mat. On the mat is arranged a finer filter-cloth and above this another wire screen. On top of the bed is arranged a ring formed by preference in two sections, as indicated at 37ª, and this ring is provided with bolts, which extend down through the filter-bed and connect with the shelf 38 beneath, so as to bend the several portions of said bed together.

Beneath the casing 30 is arranged a sluice 39, having a swinging valve or flap 40 pivotally arranged near its end and adapted to receive upon it the liquid discharged from the outlet 36 of the filter. The flap or valve 40 is adapted to be swung in opposite directions, so as to discharge the liquid flowing from the outlet 36 either into the sluice 39 or into a chamber 41, formed at the end thereof and communicating with another sluice adapted to convey the waste liquid away. The sluice 39 by preference will connect with a tank wherein the solution may be stored. Another sluice 42 is arranged adjacent to the lower end of the filter and is adapted to receive the slime from the same when the filter is swung on its trunnions, and said sluice 42 will be by preference provided with a series of riffles adapted to receive and collect the amalgam contained in the slime.

In operation the charge after being worked in the drum 5 is supplied to the upper portion of the filter 30 through the manhole 34, and said manhole being closed compressed air is supplied through the connection 35, so as to force the liquid contained in the charge through the filter-bed 37 to the lower part of the filter, whence it passes by way of the outlet 36 to the sluice 39, the valve 40 being set to direct the solution into said sluice. When the solution has been forced from the filter, a suitable charge of water is admitted to the upper part thereof and the valve 40 is turned. The manhole 34 being again closed, compressed air is supplied to the upper portion of the filter to force the water through the slime on the filter-bed and wash the same, and said water will be discharged through the outlet 36 into the chamber 41. After the slime has been washed, as above described, the manhole-cover is removed from the upper portion of the filter, and the filter is swung on its trunnions, so as to present said manhole in position to discharge the slime or pulp into the sluice 42. The outlet 36 at the lower portion of the filter is adapted to receive a hose for supplying water to the filter, whereby when the filter is swung so that said outlet stands in a raised position water may be admitted at said outlet 36 to force the slime from the upper portion of the filter into the sluice 42, down which it passes, the amalgam being collected in the riffles of said sluice.

From the above description it will be seen that the operation of the process is made practically continuous, since a fresh charge of ore and solution may be placed in the drum as soon as an exhausted charge is removed. In some cases it may be found advantageous to employ compressed air surcharged with oxygen instead of ordinary compressed air, but this is not usually essential.

The ore in falling through the air at the upper part of the drum absorbs the oxygen, and as the ore sinks into the solution the action of the cyanid of potassium on the metallic particles is accelerated.

Having thus described my invention, I claim as new and desire to secure by Letters Patent—

1. In an apparatus for extracting precious metals, the combination of a rotative drum adapted to receive the ore to be treated, a core arranged in the drum, metallic plates forming the positive and negative electrodes of an electric circuit and carried respectively on the drum and core, and an electrical connection for the plates on the core, the said connection being carried by the drum and arranged to hold the core against turning in the said drum, substantially as set forth.

2. In an apparatus for extracting precious metals, the combination of a rotative drum adapted to receive the ore to be treated, a series of longitudinally-extending metal plates arranged on the inner surface of the drum and forming one terminal of an electric circuit, a core arranged in and insulated from the drum and provided with a series of longitudinally-extending channels metal plates arranged in the said channels and forming the other terminal of an electric circuit, and means carried by the drum for agitating the contents thereof, substantially as set forth.

3. In an apparatus for extracting precious metals, the combination of a drum adapted to contain the ore to be treated, a core arranged in the drum and provided with metal plates forming one terminal of an electric circuit, metal plates extending along the inner surface of the drum and forming the other terminal of the electric circuit, and strips arranged between the plates on the drum for holding the same in place, said strips being provided with projecting end portions adapted to agitate the contents of the drum, substantially as set forth.

4. In an apparatus for extracting precious metals, the combination of a rotative drum, having metal plates forming one terminal of an electric circuit and provided with agitating devices, a core arranged within the drum and provided with longitudinal channels, metal plates arranged in the channels and forming the other terminals of an electric circuit, and means carried by the core between its metal plates, for holding the plates in position, substantially as set forth.

5. In an apparatus for extracting precious metals, the combination of a rotative drum having agitating devices and metal plates forming one terminal of an electric circuit, a core within the drum having metal plates extending longitudinally along it and forming the other terminal of an electric circuit, and an insulated electric connection for said plates on the core, said connection being carried by the drum and arranged to hold the core against turning therein, substantially as set forth.

6. In an apparatus for extracting precious metals, the combination of a rotative drum provided with a manhole and having a valved connection for the admission of compressed air, a core of insulating material mounted to turn in the said drum, metal plates forming the positive and negative electrodes of an electric circuit and arranged respectively on the drum and core, and an electrical connection for said plates on the core, the said connection being arranged to lock the drum and core together, substantially as set forth.

EMANUEL MOTZ.

Witnesses:
J. L. CAPLINGER,
JAMES M. HENLEY.